(12) United States Patent
Iida et al.

(10) Patent No.: US 6,430,340 B1
(45) Date of Patent: Aug. 6, 2002

(54) WAVELENGTH TUNABLE FILTER DEVICE

(75) Inventors: Masanori Iida, Katano; Hiroyuki Asakura, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/315,030

(22) Filed: May 20, 1999

(30) Foreign Application Priority Data

May 20, 1998 (JP) .......................................... 10-138803

(51) Int. Cl.[7] .................................................. G02B 6/32
(52) U.S. Cl. ....................................................... 385/33
(58) Field of Search ................................ 385/77, 47, 37, 385/33–35, 59, 63, 115–116, 120, 85, 80, 57, 147, 54, 25, 27, 31

(56) References Cited

U.S. PATENT DOCUMENTS 5,377,286 A   12/1994  Iida et al. ..................... 385/33
5,420,416 A    5/1995  Iida et al. ................. 250/201.1

FOREIGN PATENT DOCUMENTS

EP   0 545 735 A1    6/1993
EP   0 682 278 A1   11/1995
JP      5-241083  *  9/1993

* cited by examiner

Primary Examiner—Frank G. Font
Assistant Examiner—Tu T. Nguyen
(74) Attorney, Agent, or Firm—Smith, Gambrell & Russell, LLP

(57) ABSTRACT

A wavelength tunable filter device has at least two optical fibers through which an optical signal is input or output; a wavelength selective element which the optical signal is input to and output from through a lens and which selects a wavelength; a mounting jig to which the wavelength selective element is fixedly secured; a rotating mechanism, having an ultrasonic motor and an encoder, for rotating the wavelength selective element; and a motor controller for controlling the ultrasonic motor for driving, wherein the mounting jig is rigidly mounted directly to a rotating shaft of the ultrasonic motor, and the amount of power that does not exceed the driving power necessary to cause the ultrasonic motor to start rotating from a stopped condition is intermittently applied to the motor controller.

14 Claims, 4 Drawing Sheets

WAVELENGTH TUNABLE FILTER DEVICE

BACKGROUND OF THE INVENTION

1. Field of the Invention

The present invention relates to a wavelength tunable filter for use in a wavelength division multiplexing transmission system and apparatus in optical communications, and also relates to a wavelength tunable filter device using the same.

2. Related Art of the Invention

In optical communications, there has been known a technique of wavelength division multiplexing which transmits signals of multiple channels through a single optical fiber. In wavelength division multiplexing, signals of different channels are optically multiplexed at different wavelengths by using a optical multiplexer at the transmitting end, and the thus multiplexed signals are transmitted through a single fiber to the receiving end; at the receiving end, the multiplexed signals are separated according to their wavelengths by means of a wavelength filter, to recover the original signals. In particular, by using a wavelength tunable filter whose wavelength is capable of being varied for signal reception, the light of desired wavelength can be separated from the light on which many wavelengths are multiplexed.

There are various types of wavelength tunable filter; among others, a wavelength tunable filter using a diffraction grating has been studied for applications in wavelength division multiplexing transmission because of its high wavelength selectivity providing good isolation between adjacent wavelengths. In high density wavelength division multiplexing transmission where signals are transmitted at closely spaced wavelengths, enhancing the operational stability and the accuracy in setting the filter for the selected wavelength has been a major challenge in the design of the filter. Since the wavelength selection is performed by rotating the diffraction grating, a minimum angular resolution of one hundred-thousandth revolution (360 degrees/100,000), or 0.05 nm in terms of wavelength, is required of the rotating mechanism if the wavelength selection is to be accomplished for multiplexed light of wavelengths spaced apart on the order of subnanometers. However, such a high resolution characteristic has been unachievable with a conventionally used stepping motor alone, and improvements in the rotating mechanism have been necessary.

FIG. 4 shows the configuration of a prior art wavelength tunable filter device. In FIG. 4(a), reference numeral 105 is a diffraction grating, 501 is a mounting jig, 2 is a lens, 3 is an input fiber, 4. is an output, fiber, 8 is an optical-to-electrical converter, 9 is an intensity level detector, 100 is a rotational position calculator, 130 is a rotational position storage, 140 is a rotational position detector, 120 is a motor driver, 61 is a stepping motor, 601 is a reduction gear, 71 is an encoder, and 801 and 802 are joints. FIG. 4(b) is a diagram showing the mounting jig 501 with the diffracting grating 105 mounted thereon, as viewed from the top of FIG. 4(a).

Wavelength multiplexed light from the input fiber 3 enters the diffraction grating 105 through the lens 2 and is chromatically dispersed so that light of desired wavelength is coupled into the output fiber 4 though the lens 2. The light is then converted by the optical-to-electrical converter 8 into an electrical signal. The mounting jig 501 with the diffraction grating 105 mounted thereon is secured to the shaft of the reduction gear 601 which is connected to the stepping motor 61 via the joint 801. The wavelength of the light to be coupled into the output fiber 4 can be selected by rotating the mounting jig 501. The speed at which the mount jig 501 rotates about its axis is slower than the speed at which the stepping motor 61 rotates about its axis, which serves to enhance the apparent rotational angular resolution.

When varying the wavelength to be selected, the motor driver 120 supplies a drive current to the stepping motor 61 which thus starts to rotate. The electrical signal from the optical-to-electrical converter 8 is input to the intensity level detector 9 for detection of the received light level. A signal from the encoder 71 connected to the stepping motor 61 by the joint 802 is extracted as rotational position information by the rotational position detector 140. While monitoring the rotational position information from the rotational position detector 140 and the received light level from the level detector 9, the rotational position calculator 100 compares them with the rotational position corresponding to the desired wavelength prestored in the rotational position storage 130 and, when the desired rotational position is reached, issues a stop command to the motor driver 120, whereupon the stepping motor 61 stops and the reduction gear 601 also stops.

In the above prior art wavelength tunable filter device, however, the rotational position of the diffraction grating is controlled via the reduction gear. Accordingly, the hysteresis that the reduction gear has in its rotational direction becomes a factor that limits the rotational angular resolution of the diffraction grating. Furthermore, the rotational resolution of the stepping motor is greatly affected by the connecting condition of the joint between the reduction gear and the stepping motor. Moreover, the use of the reduction gear increases not only the overall size but also the axial length of the rotating mechanism, as a result of which stability cannot be secured for the rotational operation of the mounting jig which has eccentricity as shown in FIG. 4(b).

Furthermore, since the rotation control is such that the rotational motion is stopped abruptly at the desired angular (wavelength) position, the absolute angular precision of the stopping motion may degrade.

SUMMARY OF THE INVENTION

The present invention has been devised to overcome the problems encountered with the above prior art wavelength tunable filter device, and an object of the invention is to provide a wavelength tunable filter device capable of achieving precise wavelength selection for multiplexed light of wavelengths spaced apart on the order of subnanometers.

The present invention of the first invention is a wavelength tunable filter device comprising: at least two optical fibers through which an optical signal is input or output; a wavelength selective element which said optical signal is input to and output from through a lens and which selects a wavelength; a mounting jig to which said wavelength selective element is fixedly secured; a rotating mechanism, comprising an ultrasonic motor and an encoder, for rotating said wavelength selective element; and a motor controller for controlling said ultrasonic motor for driving, wherein said mounting jig is rigidly mounted directly to a rotating shaft of said ultrasonic motor, and the amount of power that does not exceed the driving power necessary to. cause said ultrasonic motor to start rotating from a stopped condition is intermittently applied to said motor controller.

Figure 1B:
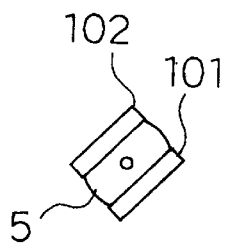
FIG. 1 is a diagram showing a configuration example of a wavelength tunable filter device according to one embodiment of the present invention.

DESCRIPTION OF THE REFERENCE NUMERALS 101, 102: DIFFRACTION GRATING
2: LENS
3: INPUT FIBER
4: OUTPUT FIBER
5: MOUNTING JIG
6: ULTRASONIC MOTOR
7: LASER ENCODER
8: OPTICAL-TO-ELECTRICAL CONVERTER
9: LEVEL DETECTOR
10: ROTATIONAL POSITION CALCULATOR
11: ROTATIONAL SPEED ADJUSTER
12: MOTOR DRIVER
13: ROTATIONAL POSITION STORAGE
14: ROTATIONAL POSITION DETECTOR
15: JOINT

PREFERRED EMBODIMENTS

One embodiment of the wavelength tunable filter device of the present invention will be described with reference to FIGS. 1 and 2.

Figure 1A:
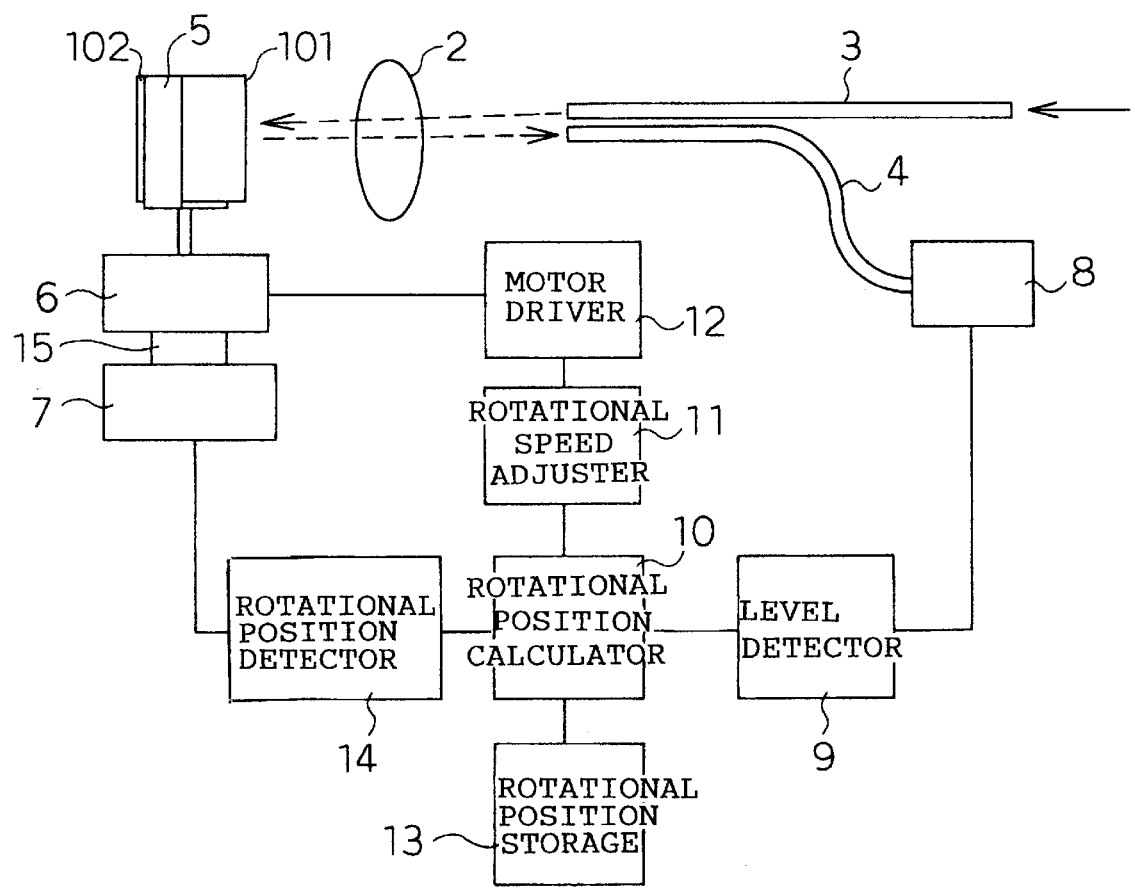

FIG. 1 shows the configuration of the wavelength tunable filter device according to the embodiment. In FIG. 1(a), reference numerals 101 and 102 are diffraction gratings, 5 is a mounting jig, 2 is a lens, 3 is an input fiber, 4 is an output fiber, 8 is an optical-to-electrical converter, 9 is an intensity level detector, 10 is a rotational position calculator, 13 is a rotational position storage, 14 is a rotational position detector, 11 is a rotational speed adjuster, 12 is a motor driver, 6 is an ultrasonic motor, 7 is a laser, encoder, and 15 is a joint.

The ultrasonic motor 6 is a motor that induces surface acoustic waves between opposing disks placed within the motor, thereby generating a slipping motion between the disks and causing a shaft fixed to the movable disk to rotate. The laser encoder 7 is capable of generating more output pulses per revolution than a conventional optical encoder, and is suitable, for enhancing the resolution of rotation control. FIG. 1(b) is a view showing the mounting jig 5 with the diffraction gratings 101 and 102 mounted thereon, as viewed from the top of FIG. 1(a).

Wavelength multiplexed light from the input fiber 3 enters, the diffraction grating 101 through the lens 2 and is chromatically dispersed so that light of desired wavelength is coupled into the output fiber 4 though the lens 2. The light is then converted by the optical-to-electrical converter 8 into an electrical signal. The mounting jig 5 with the diffraction grating 101 mounted thereon is directly secured to the shaft of the ultrasonic motor 6, and the wavelength of the light to be coupled into the output fiber 4 can be selected by rotating the mounting jig 5. The diffraction gratings 101 and 102 are fixedly secured to the mounting jig 5 at positions symmetrical about the rotating shaft thereof, and are designed, for example, to exhibit optimum chromatic dispersion characteristics in respectively different wavelength regions.

Figure 2:
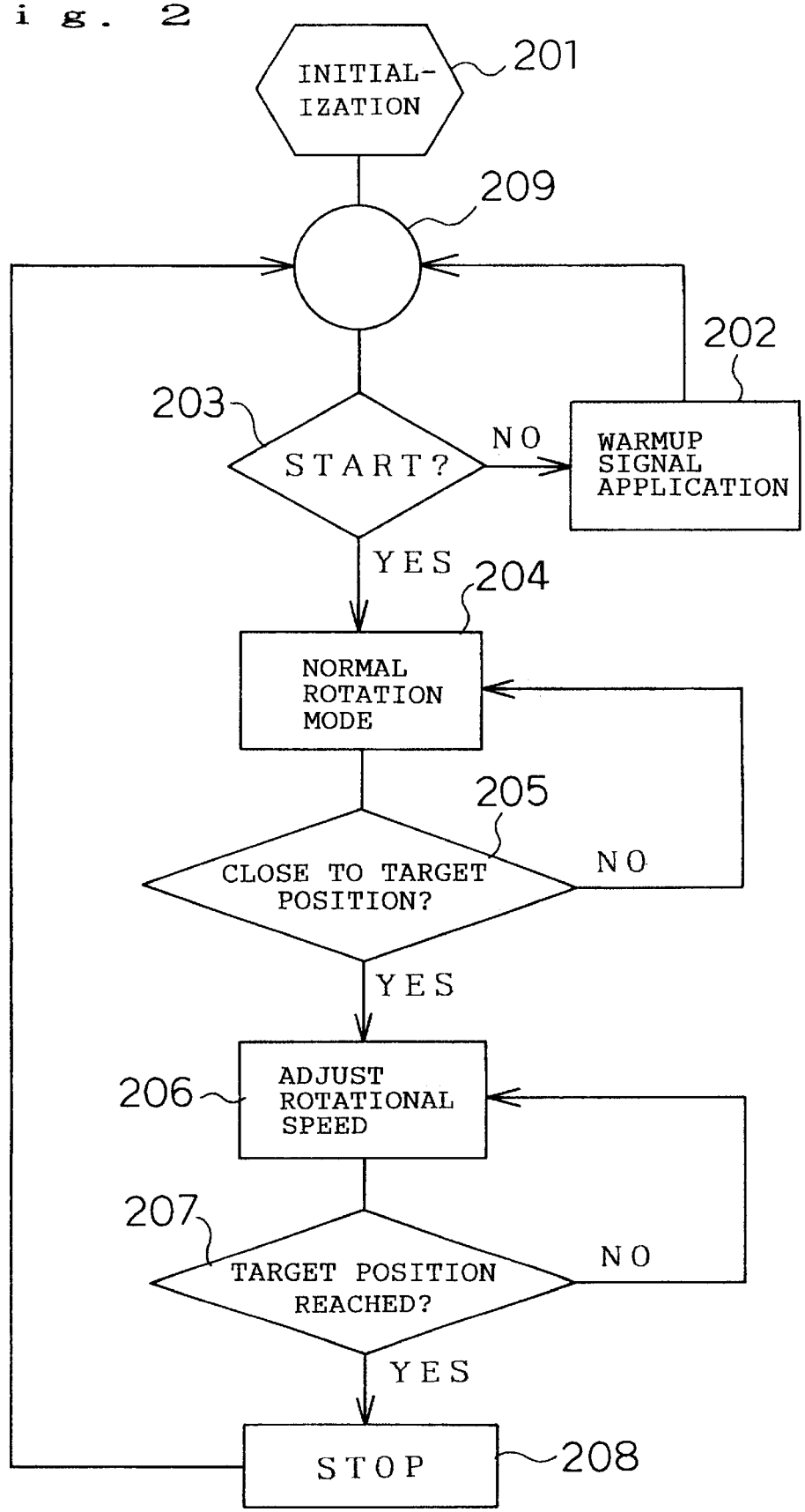
FIG. 2. is a diagram showing an operation flow in the embodiment of FIG. 1.

The operation flow of this embodiment is as shown in FIG. 2. Initialization step 201 is carried out when power is turned on. Routine 203 detects the presence or absence of a selected-wavelength shifting instruction; if the instruction is not present, the process branches to a warmup signal application routine 202 in which a power signal of the amount that does not exceed the driving power necessary to cause the ultrasonic motor 6 to start rotating from its stop position is intermittently applied from the motor driver 12 via the rotational speed adjuster 11 to the ultrasonic motor 6. As the power applied for this purpose, a pulse (on the time axis) or a pulse-like signal (on the time axis) with a pulse width of a few milliseconds, for example, is applied at intervals of one second. Rather than applying power continuously, such intermittent application makes it easier to digitally fine adjust the warmup operation. It also makes it easier to suppress noise generation. That is, various adjustments can be made by varying the pulse application interval, pulse width, pulse height, etc.

On the other hand, if the instruction is present, a normal rotation mode routine 204 is carried out to start the motor rotation. Based on the specified wavelength, the angular position is calculated by referring to the rotational position storage 13, and this angular position is set as the target position. The normal rotating operation is performed until the angular position comes close to the target position. Whether the angular position has come close to the target position is judged in routine 205 based on the angular position information that the rotational position detector 14 detects from the signal being output from the laser encoder 7 connected to the ultrasonic motor 6 via the joint 15. Power whose level is adjusted by the rotational speed adjuster 11 according to the nearness to the target position is supplied to the, motor driver 12, thus continuing to rotate the ultrasonic motor 6 but gradually reducing its rotational speed. In the meantime, the electrical signal from the optical-to-electrical converter 8 is input to the intensity level detector 9 for detection of the received light level. While monitoring the angular position information and the received light level from the level detector 9, the rotational position calculator 10 issues a stop command to the motor driver 12 in routine 208 when the target position is reached, and the ultrasonic motor 6 thus stops smoothly. Thereafter, the process proceeds to routine 209 to wait for a selected-wavelength shifting instruction.

Using the ultrasonic motor, as described above, it becomes possible to adjust the rotational speed without using a reduction gear; this serves not only to reduce the size of the rotating mechanism but also to dramatically improve the angular setting precision in the rotating operation. Furthermore, since the jig with the diffraction gratings mounted thereon can be attached directly to the motor shaft, highly precise rotation control free from hysteresis can be achieved. Moreover, with the function of applying a warmup signal while the motor is in a stopped condition, fast response speed can be achieved by overcoming the inherent problem of ultrasonic motors that when the motor is in a stopped condition for a long period of time, the response time for the motor to start rotating increases because of increased adhesion between the opposing disks placed within the motor.

Further, by mounting two diffracting gratings on the mounting jig in axially symmetric fashion, not only can the rotational stability be enhanced by eliminating eccentricity from the mounting jig, but wavelength selection over a very wide wavelength band can also be achieved with the characteristic of one grating complementing that of the other grating.

When a Fourier diffraction grating (described, for example, in Patent No. 2599455) is used for each diffraction grating, a wavelength tunable filter can be achieved that has a high diffraction efficiency and in which the difference in diffraction efficiency due to the polarization direction of the incident light (polarization dependency) is small. With this configuration, a minimum angular resolution of one hundred-thousandth revolution, or 0.05 nm in terms of wavelength, for example, can be easily achieved with a small-size rotating mechanism.

Figure 3:
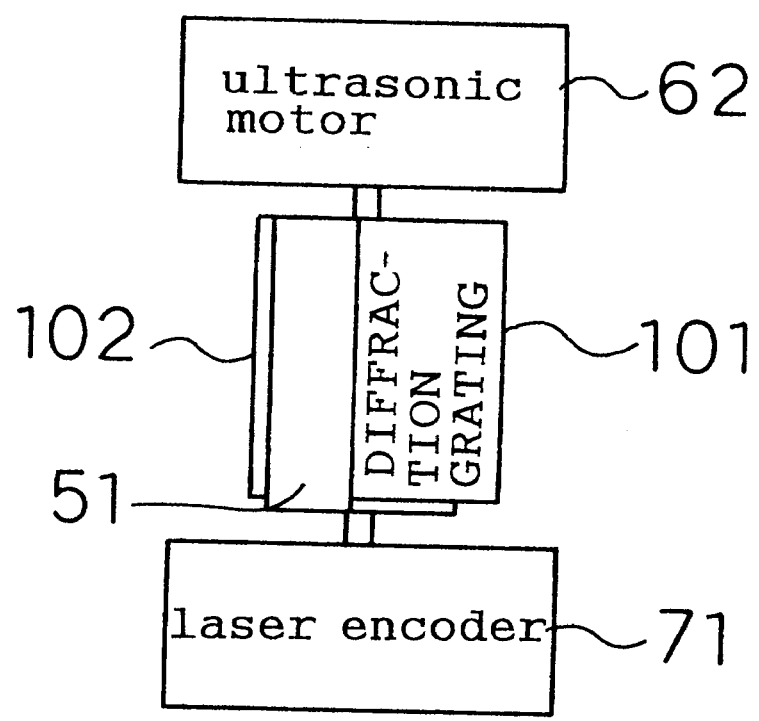
FIG. 3 is a diagram showing an alternative structure of a mounting jig in the wavelength tunable filter device according to the embodiment of the present invention.
Figure 4B:
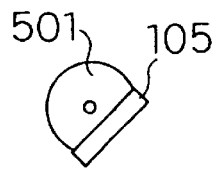
FIG. 4 is a diagram showing a configuration example of a prior art wavelength tunable filter.
Figure 4A:
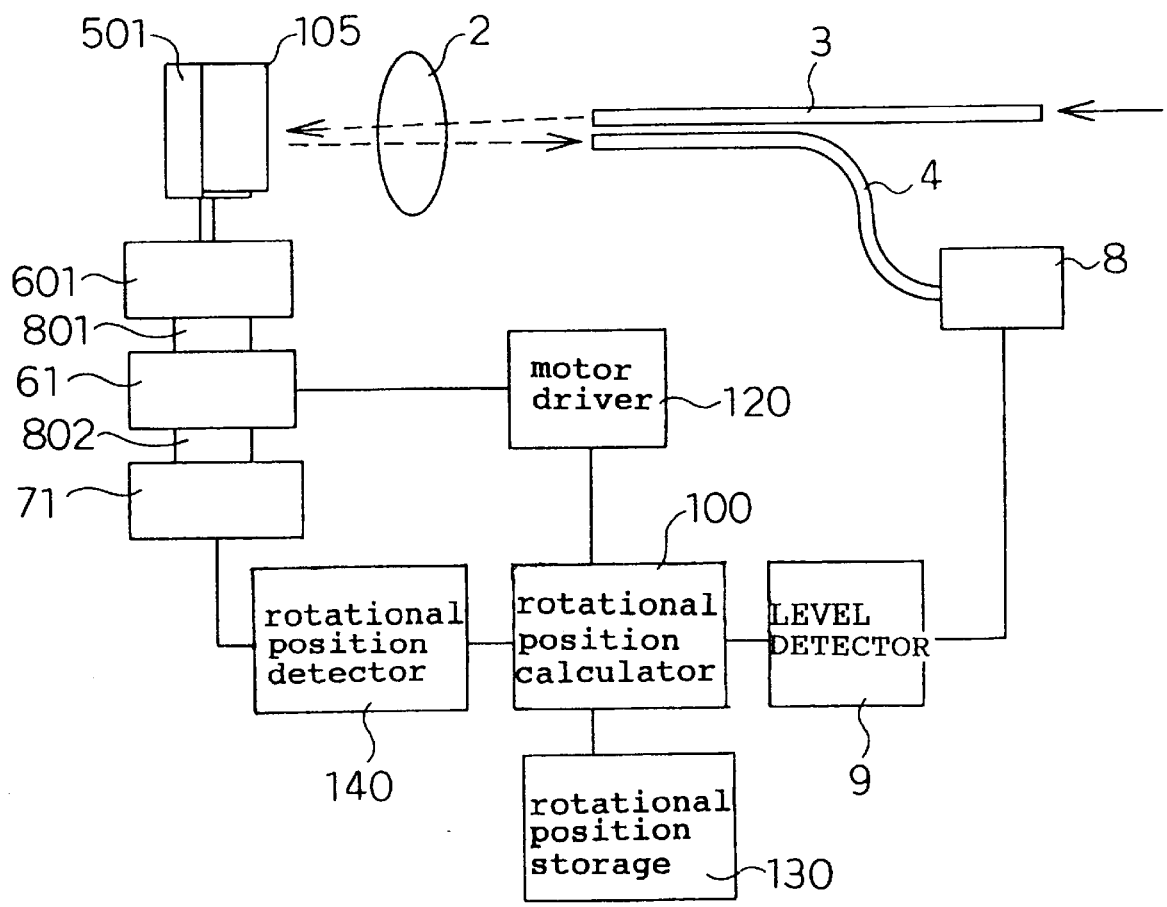

In the present embodiment, the mounting jig 5 is disposed upwardly of the ultrasonic motor 6 and laser encoder 7. Alternatively, if the mounting jig 51 with the diffraction gratings 101 and 102 mounted thereon is disposed between the ultrasonic motor 62 and laser encoder 71 so that it also serves as a joint between them, as shown in FIG. 3, the rotating mechanism can be further reduced in size; this structure is also advantageous from the viewpoint of modularizing the device: including the lens and optical fibers.

The present embodiment has dealt with an example in which two diffraction gratings are mounted on the mounting jig 5, but it will be appreciated that more than two diffraction gratings may be mounted as long as the diffraction gratings are disposed in axially symmetric fashion. In that case, the tunable wavelength range can be further expanded.

Furthermore, if a reflecting plate is attached to at least one of the diffraction gratings mounted on the mounting jig, the function of an optical switch that covers the full wavelength range can be added to the structure.

In the present embodiment, the lens is simply described as a lens, but if an a spherical lens is used, the optical system can be simplified and the size of the device can also be reduced. It is desirable that the lens be coated with an anti-reflection film for the wavelength band used.

The thus constructed wavelength tunable filter device of the present invention is capable of selecting light of desired wavelength from multiplexed light of wavelengths spaced apart on the order of subnanometers, with a high resolution and in a stable manner. Further,the device can be reduced in size, and wavelength selection over a wide wavelength range can be achieved.

What is claimed is:

1. A wavelength tunable filter device comprising: at least two optical fibers through which an optical signal is input or output; a wavelength selective element which said optical signal is input to and output from through a lens and which selects a wavelength; a mounting jig to which said wavelength selective element is fixedly secured; a rotating mechanism, comprising an ultrasonic motor and an encoder, for rotating said wavelength selective element; and a motor controller for controlling said ultrasonic motor for driving, wherein said mounting jig is rigidly mounted directly to a rotating shaft of said ultrasonic motor, and an amount of power that does not exceed the driving power necessary to cause said ultrasonic motor to start rotating from a stopped condition is intermittently applied to said motor by said motor controller.

2. A wavelength tunable filter device according to claim 1, wherein said wavelength selective element is a diffraction grating or a Fabry-Perot etalon element.

3. A wavelength tunable filter device according to claim 2, wherein said diffraction grating is a Fourier diffraction grating.

4. A wavelength tunable filter device according to claim 1, wherein said encoder in said rotating mechanism is an optical encoder that uses a semiconductor laser in a rotational position detection system.

5. A wavelength tunable filter device according to claim 1, wherein said output fiber includes a light detector, and said motor controller controls the rotational speed of said ultrasonic motor based on a light intensity signal detected by said light detector.

6. A wavelength tunable filter device according to claim 1, wherein at least two diffraction gratings are mounted on said mounting jig symmetrically about the rotating shaft thereof.

7. A wavelength tunable filter device according to claim 1, wherein said rotating mechanism, has a minimum rotational angular resolution of one hundred-thousandth revolution.

8. A wavelength tunable filter device comprising: at least two optical fibers through which an optical signal is input or output; a wavelength selective element which said optical signal is input to and output from through a lens and which selects a wavelength; a mounting jig to which said wavelength selective element is fixedly secured; a rotating mechanism, comprising an ultrasonic motor and an encoder, for rotating said wavelength selective element; and a motor controller for controlling said ultrasonic motor for driving, wherein said mounting jig is rigidly mounted directly to a rotating shaft of said ultrasonic motor, said mounting jig being disposed between-said ultrasonic motor and said encoder.

9. A wavelength tunable filter device according to claim 8, wherein said wavelength selective element is a diffraction grating or a Fabry-Perot etalon element.

10. A wavelength tunable filter device according to claim 9, wherein said diffraction grating is a Fourier diffraction grating.

11. A wavelength tunable filter device according to claim 8, wherein said encoder in said rotating mechanism is an optical encoder that uses a semiconductor laser in a rotational position detection system.

12. A wavelength tunable filter device according to claim 8, wherein at least two diffraction gratings are mounted on said mounting jig symmetrically about the rotating shaft thereof.

13. A wavelength tunable filter device according to claim 8, wherein said output fiber includes a light detector, and said motor controller controls the rotational speed of said ultrasonic motor based on a light intensity signal detected by said light detector.

14. A wavelength tunable filter device according to claim 8, wherein said rotating mechanism has a minimum rotational angular resolution of one hundred-thousandth revolution.

* * * * *

UNITED STATES PATENT AND TRADEMARK OFFICE
CERTIFICATE OF CORRECTION

| | |
|---|---|
| PATENT NO. | : 6,430,340 B1 |
| DATED | : August 6, 2002 |
| INVENTOR(S) | : Masanori Iida et al. |

It is certified that error appears in the above-identified patent and that said Letters Patent is hereby corrected as shown below:

<u>Title page,</u>
Item [56], References Cited, FOREIGN PATENT DOUCMENTS, include the following references:
-- JP     2599455     1/1997
   JP     2626810     4/1997 --

Signed and Sealed this

First Day of April, 2003

JAMES E. ROGAN
*Director of the United States Patent and Trademark Office*